US006508354B2

(12) United States Patent
Breed et al.

(10) Patent No.: US 6,508,354 B2
(45) Date of Patent: Jan. 21, 2003

(54) ENDLESS BELT

(75) Inventors: John A. Breed, Littleton, CO (US);
Harley Morgan, Littleton, CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/897,375

(22) Filed: Jul. 2, 2001

(65) Prior Publication Data

US 2002/0036129 A1 Mar. 28, 2002

Related U.S. Application Data

(60) Provisional application No. 60/215,460, filed on Jun. 30, 2000.

(51) Int. Cl.$^7$ ................................................. B65G 15/34
(52) U.S. Cl. ........................ 198/847; 198/846; 198/957
(58) Field of Search .................................. 198/847, 846, 198/957

(56) References Cited

U.S. PATENT DOCUMENTS

| 3,596,753 | A | * | 8/1971 | Knapp et al. ................ 198/193 |
| 3,963,113 | A | | 6/1976 | Boyer |
| 4,025,695 | A | * | 5/1977 | Newman ..................... 428/492 |
| 4,226,417 | A | * | 10/1980 | Camilleri ................... 273/43 R |
| 4,299,588 | A | * | 11/1981 | Standley ..................... 474/264 |
| 4,470,500 | A | | 9/1984 | Howerton |
| 4,705,161 | A | | 11/1987 | Gozdiff |
| 4,823,942 | A | * | 4/1989 | Martin et al. ................ 198/847 |
| 5,286,542 | A | * | 2/1994 | Susi et al. ..................... 428/58 |
| 5,609,243 | A | | 3/1997 | Fujita et al. |
| 5,610,217 | A | * | 3/1997 | Yarnell et al. ............... 524/397 |
| 5,700,871 | A | * | 12/1997 | Arjunan et al. ................ 524/74 |
| 6,180,703 | B1 | | 1/2001 | Onoi et al. |
| 6,193,835 | B1 | * | 2/2001 | Yoshikawa et al. ......... 156/281 |
| 6,206,364 | B1 | * | 3/2001 | Brinkman et al. .......... 271/193 |
| 6,245,834 | B1 | * | 6/2001 | Bomal et al. ................ 523/213 |

* cited by examiner

*Primary Examiner*—Douglas Hess
(74) *Attorney, Agent, or Firm*—M. S. Olson, Esq.; C. H. Castleman, Esq.; S. G. Austin, Esq.

(57) ABSTRACT

A belt used in conjunction with at least one pulley, said belt capable of cooperating with an oppositely facing endless belt to contact and convey articles, said belt comprising: a first layer comprising a first flexible material, extending longitudinally of the belt and comprising a driving surface of said belt; a second layer comprising a second flexible material, spaced from and generally parallel to said first layer and possessing a first surface, and a second surface disposed opposite said first surface and defining an article conveying surface of said belt; a tensile section of high modulus material disposed between said first and second layers, wherein at least one of the first and second flexible materials comprises a polychloroprene and ethylene alpha olefin elastomer blend composition. The belt exhibits improved conveying properties, including long-term frictional properties and hardness characteristics, particularly suitable for utilization as a topping layer in bowling-pin conveying applications.

8 Claims, 2 Drawing Sheets

ENDLESS BELT

This application claims the benefit of U.S. Provisional Application No. 60/215,460, filed Jun. 30, 2000.

BACKGROUND OF THE INVENTION

The present invention relates to endless belts, and particularly to such belts that are suitable for conveying articles, and more particularly to a bowling pin conveyer apparatus, and specifically to such apparatus incorporating endless belts for conveying bowling pins from a collection area to a pinsetter apparatus.

A bowling pin conveyer apparatus or mechanism, hereafter, pin conveying apparatus, typically embodies one or more elongate chutes, each having a forward end and a rearward end. The chute comprises a bottom surface extending from the forward end to the rearward end, and two juxtaposed, oppositely facing walls, similarly extending from the forward end to the rearward end of the chute, and intersecting the bottom surface to define chute corners. The chute is commonly arranged to define a conveying area that is inclined in relation to the ground.

Two endless belts traverse the length of the chute and are typically situated one each at or near the respective corners of the chute. The belts are trained about at least a driver sprocket or pulley located outside the chute and near its rearward end, and a driven sprocket or pulley, similarly located outside the chute but near its forward end. The chute is typically formed such that its effective width accommodates the breadth of a standard-sized bowling pin lying on its side, with its base directed to the rearward end of the chute.

In operation, a feeding apparatus delivers one or more bowling pins, hereafter, "pins", from a collection area to the forward end of the chute, which generally defines a mouth or pin-receiving portion. As the belts are driven about the pulleys, a lateral portion of the pin first contacts at least a portion of the pin-engaging or -contacting surface of one or both belts. The pin is then urged through surface contact with the moving belt pin-contact surfaces to the proper position within the chute, and is thence conveyed through the chute through surface contact with respective pin-contact portions of the opposing belt pair, and ultimately out a rearward end of the chute to a pin setter apparatus.

Traditionally, endless belts utilized in such applications have been formed such that at least their pin-contacting surface exhibits low hardness characteristics, to provide the frictional characteristics necessary to establish contact with and convey bowling pins from the collection area to the pinsetter apparatus. The low hardness material generally utilized for such applications has been a conventional, general purpose polychloroprene composition. Such low hardness compositions tended to deform to the shape of the pin on contact therewith, allowing for an increase in surface area contact with the pin.

The frictional characteristics of bowling pins however have changed over time through the application of low-coefficient of friction coatings now widely employed to prevent or minimize deterioration of the pin surface. Low coefficient of friction oils increasingly used on bowling lanes, which are frequently transferred to the bowling pin surface in use, further contribute to the decreasing effective coefficient of friction at the pin surface. Conventional low hardness polychloroprene compositions utilized in belt sidewalls proved largely ineffective in conveying these low-coefficient of friction-coated pins.

Attempts at modifying conventional polychloroprene compositions for use in such belts to adjust their frictional characteristics in order to effectively convey the pins have included incorporating additional plasticizers in the elastomer compositions; reducing reinforcing and semi-reinforcing fillers (such as carbon black, silica, clays, etc.); and conversely increasing the polymer content of the compositions.

While each of these methods has been at least somewhat effective in reducing the initial hardness of the resultant compositions, changes in the belt pin-contacting surface nonetheless occur over time; it is believed that the polychloroprene compositions gradually harden due to their tendency toward crystallization over time, to a point where they can no longer effectively convey the pins. This polymer hardening effect is believed to have a greater impact on the polychloroprene elastomer's pin-conveying effectiveness, than the polymers' coefficient of friction.

SUMMARY OF THE INVENTION

According to the present invention, an endless belt is provided comprising a first layer extending longitudinally of the belt and comprising a first flexible material, and a second layer generally parallel with the first layer and comprising a second flexible layer composition, and a load carrying section embedded in the belt, wherein at least one of the first flexible material and the second flexible material comprises an elastomer blend composition comprising at least a polychloroprene elastomer and an ethylene alpha olefin elastomer.

In another embodiment, such endless belt suitable for use within a pin conveying apparatus is provided.

In a further embodiment an endless belt is provided for incorporation in a pin conveying apparatus having endless members including two such juxtaposed belts, each of which comprises a pin-contacting portion, a driving surface and a load-carrying member disposed proximate the driving surface and extending along the length of the belt. At least the pin-contacting portion of the belt is formed of an elastomeric composition comprising a blend of polychloroprene elastomer and an ethylene alpha olefin elastomer.

In a preferred embodiment of the present invention, the ethylene alpha olefin elastomer is ethylene propylene diene terpolymer elastomer, and in another embodiment the ethylene alpha olefin elastomer such as the ethylene propylene diene terpolymer is only partially cured.

These and other objects or advantages of the invention will be apparent by reviewing the drawings and description thereof. The accompanying drawings, which are incorporated in and form a part of the specification, illustrate various embodiments of the invention, and together with the description, serve to explain the principles of the invention. In the drawings, like numerals denote like parts and;

DETAILED DESCRIPTION

Figure 1:
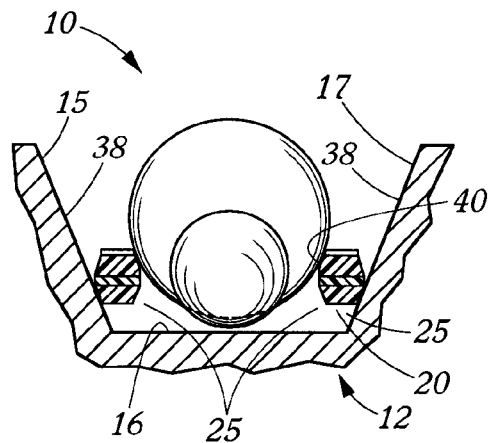
FIG. 1 is a cross-sectional front end view of a pin conveyer apparatus equipped with a set of endless belts each constructed in accordance with an embodiment of the present invention arranged in juxtaposed fashion.
Figure 2:
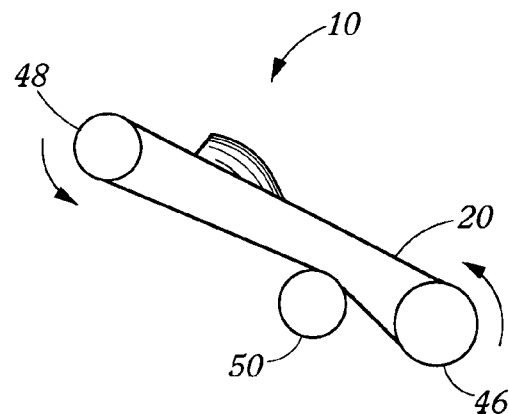
FIG. 2 is a side view of a portion of the pin conveyer apparatus of FIG. 1 with structure removed to expose one of the pair of belts of FIG. 1, and associated sheaves therefor.
Figure 3:
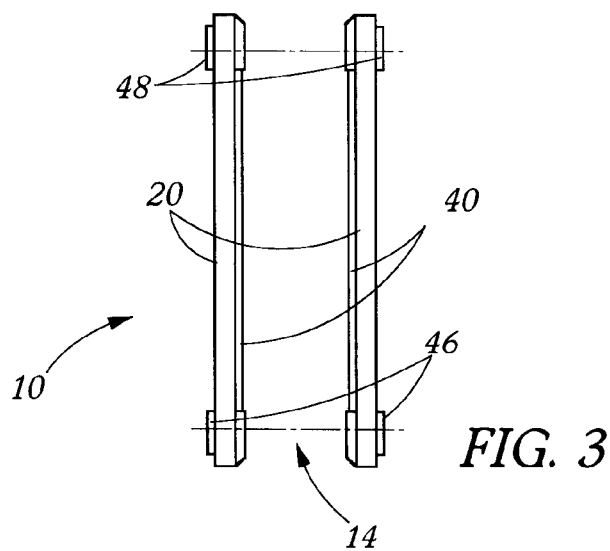
FIG. 3 is a plan view of a portion of the pin conveyer apparatus of FIG. 1 with structure removed to illustrate the pair of belts in juxtaposed fashion.

Portions of a pin conveyer apparatus incorporating endless belt members are shown in several views in FIGS. 1–3, as would be readily recognized by one familiar with such mechanisms. The apparatus 10 comprises three forwardly extending wall segments 15, 16, 17 that together form a chute 12, and that that terminate at the chute's forward end to define a pin receiving passageway 14 or mouth. Inside the chute 12 are located juxtaposed and oppositely facing endless belts 20. The belts 20, which in the illustrated embodiment define V-belts, may be entrained around pulleys or sheaves in generally parallel fashion as shown in FIG. 1, or in some pin conveyer apparatuses, the belts may follow a more rigorous serpentine path to additionally follow any contours of the chute 12 or other machine elements (not shown). Operation and construction of the belts 20 are substantially the same whether they are used in parallel or serpentine fashion. Belts of juxtaposed pairs are similar in construction but may be of either equal or unequal lengths.

Figure 4:
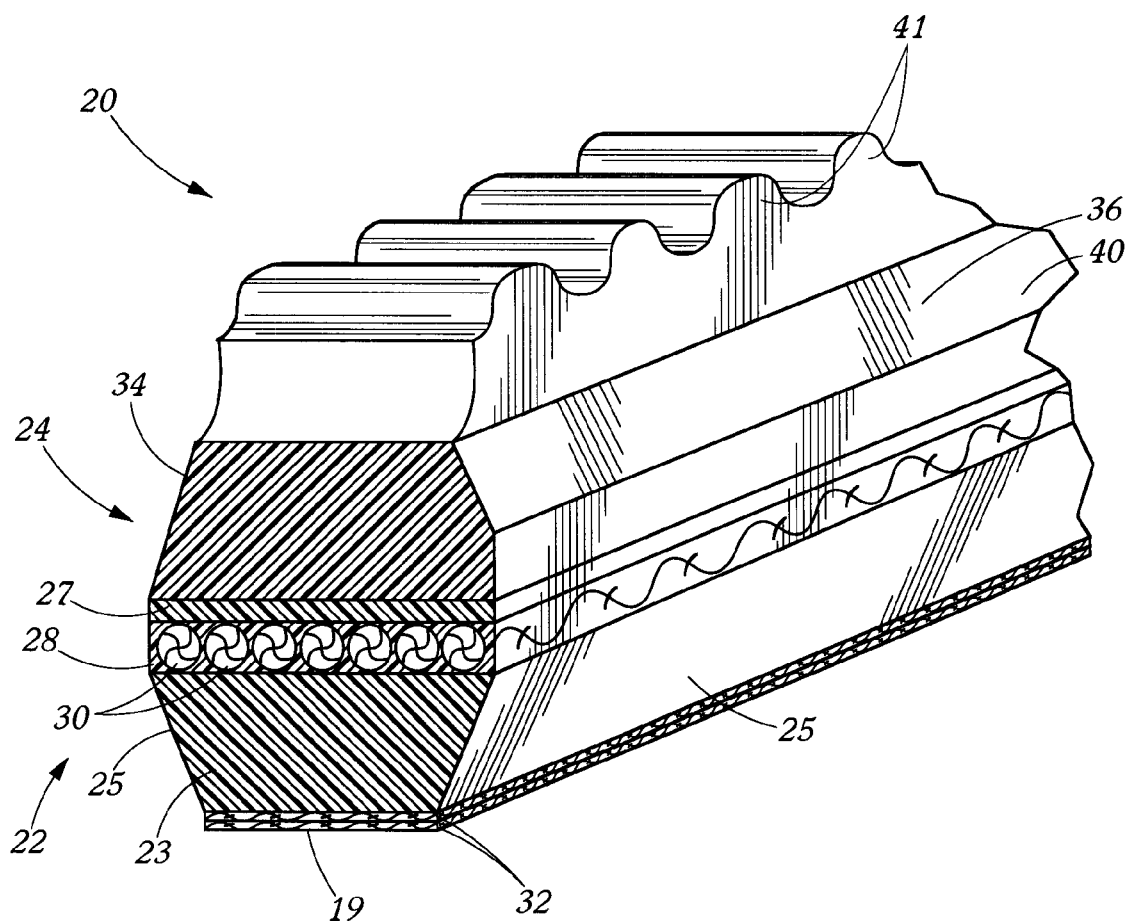
FIG. 4 is an enlarged, cross-sectional perspective view of a portion of a belt as shown in FIGS. 1–3.

Referring more specifically to FIGS. 1, 3 and 4, the V-belt 20 further comprises a first layer 22, and a second layer 24 which are generally parallel one another and are formed of or comprise polymeric flexible, generally resilient materials, further described below. What is meant by the term, "flexible" within the context of this disclosure is the condition wherein the so-described material is capable of being bent. In the illustrated embodiment, the first layer 22 comprises a V-belt undercord portion (or compression section) 23, a load carrying section 28, and a tension section 27.

The V-belt compression section 23 possesses a conventional trapezoidal cross-sectional configuration. As in any conventional V-belt, the side edges 25 serve as the driving surfaces of the V-belt, which in operation drivingly engage complementary surfaces of a V-belt sheave (or pulley) of suitable dimensions. In the particular embodiment shown in FIG. 1, the bottom surface 19 of the compression section 23 possesses a generally flat surface.

While in the illustrated embodiment a V-belt is described, it should be readily apparent that the belt of the present invention could likewise be formed according to any suitable configuration, including but not limited to flat belting, multi-v-ribbed belting, or synchronous- or toothed belt driving configurations, particularly where relatively short drive lengths are involved. The teeth of such toothed belt may have any desired spacing or dimension for meshing with grooves of a toothed pulley. Obviously, the dimensions, spacing and number of teeth would influence the configuration of the corresponding toothed pulley.

The tension section 27 and the compression section 23 may be formed of the same or different materials, which may be of any conventional and/or suitable elastomer composition, and which may beneficially constitute a conventional general purpose rubber. Elastomers that may suitably be utilized in either the tension section 27 or the compression section 23 of the belt include for example polychloroprene rubber (CR), Acrylonitrile butadiene rubber (NBR), hydrogenated NBR (HNBR), styrene-butadiene rubber (SBR), alkylated chlorosulfonated polyethylene (ACSM), epichlorohydrin, butadiene rubber (BR), polyisoprene rubber including natural and/or synthetic varieties (NR), ethylene alpha olefin elastomers including but not limited to ethylene propylene copolymers (EPM), ethylene propylene diene terpolymers (EPDM), ethylene butene butene copolymer; ethylene pentene copolymer and ethylene octene copolymer, and combinations of two or more of the foregoing, provided it is compatible with and when cured, exhibits sufficient adhesion to the surrounding materials, including that of the second layer 24, described in detail below. In one embodiment, the elastomer portions of the tension section 27 and compression section 23 are formed of a suitable SBR/EPDM blend composition. Such composition preferably also includes carbon black and/or silica fillers, process aids, a suitable antioxidant system and a sulfur/sulfur donor cure system.

The elastomeric portions of the compression section 23 and/or tension section 27 may moreover be fiber loaded as is well known in the art, to provide the proper frictional characteristics for a given application, utilizing materials such as cotton, polyester, fiberglass, aramid and nylon, in such forms as staple- or chopped fibers, flock or pulp, in amounts generally employed for such purpose, and preferably such that at least a substantial portion thereof are formed and arranged to lie in a direction generally transverse the direction of travel of the belt. In a preferred embodiment of the present invention, the elastomer portions of the tension section 27 and the compression section 23 are fiber loaded with a suitable quantity of cotton and polyester blend fibers.

A conventional or suitable rubberized fabric cover element may be disposed along the bottom surface 19 of the compression section 23 between its driving surfaces as shown, comprising one or more rubberized fabric layers 32, in order to increase the belt's resistance to stress cracking in that area.

A load-carrying section 28 is disposed between the tension section 27 and compression section 23 and comprises at least one longitudinally extending tensile cord 30 embedded in an elastomeric material which may be formed of any suitable material such as neoprene (i.e., polychloroprene) gum or the like. The tensile cord(s) of the load-carrying section may similarly be formed of any suitable and/or conventional material, including aramid, nylon, polyester, fiberglass, carbon fiber, etc., and may be of any suitable and/or conventional form, including braid, wire, cord, etc. In one embodiment, the tensile member is formed of one or more polyester or aramid cords helically wrapped and generally embedded in the tension section, extending in the longitudinal-, i.e., direction of travel, of the belt.

Turning now to a description of the second layer 24 of the belt, such portion further includes first and second oppositely facing surfaces, each defining a belt topping portion surface 34, 36. The first topping portion surface 34 can be seen to oppose the inner surface 38 of a lateral wall 15, 17 of the chute 12 in operation of the apparatus 10. The second, oppositely facing topping portion surface 36 comprises the pin engaging or pin contacting surface 40 of the belt, described in further detail below.

In use as part of a pin conveying apparatus, belts are paired and arranged in juxtaposed position oppositely facing each other such that at least a portion of the paired belts are generally parallel. The belts are each tensioned around at least two V-belt sheaves, sprockets or pulleys 46, 48 (or toothed pulleys as appropriate, not shown) where one of which is a driver pulley, optionally in combination with an idler pulley 50 as shown. Unless otherwise and then only to the extent further described, the terms, "sheave", "sprocket" and "pulley", are used interchangeably within the context of this disclosure to denote the same part. Both pulleys 46, 48 are located outside the chute, one from each pair at each end thereof, such that only a portion of the belt travel path is within the chute 12 as shown. The drivers 46 receive rotational power from any conventional or suitable power-imparting mechanism (not shown). The driver pulleys 46 of a pair rotate in the same direction as each other to propel the belts, generally base first, in a rearward- conveying manner as shown. Each pair of belts (and the chute itself may be inclined rearwardly upward, as shown in FIG. 2.

The chute 12 is formed such that generally parallel portions of a pair of belts located at its respective corners are preferably spaced sufficiently close to each other such that at least a portion of a prone pin being conveyed base-first through the chute between the belts is in surface contact with the pin-contact surface 40 of at least one, and preferably of both belts, throughout the conveying process. The second topping portion surface 36 of the belt, including the pin-contact surface 40, preferably possesses a geometry as indicated in FIGS. 1 and 4 (achieved by cutting, grinding, molding or otherwise forming) such that a portion thereof is at a sufficient slope that when utilized in opposing pairs, two such belts bear a prone bowling pin between them within a chute as shown in FIG. 1, and generally prevent the lateral portion of the pin closest to the chute bottom wall 16 from contacting such wall 16. The top or head portion of the bowling pin may however contact such wall during conveyance of the pin.

When ribs 41 are incorporated in the top surface of the second layer 24 as conventionally employed and as shown in FIG. 4, the rib height and/or depth may be varied as shown to affect how aggressively pins are initially engaged. A rib height of around 0.5 cm or less is normally sufficient, and a rib depth varying from about 0.15 cm to about 0.5 cm may be desirable.

The topping portion surfaces 34, 36 (and particularly that comprising the pin-contact surface 40) preferably remain uncovered or raw, i.e., they do not include a rubber skim-coated fabric layer; to allow for maximum contact between the pin and the elastomeric portion of the topping layer during the conveying process.

While in the illustrated embodiment the pin-conveying surface 40 is described as being sloped but generally flat, one of ordinary skill in the relevant art would readily recognize that the configuration of such surface, as well as of the surrounding surfaces making up the topping portion second surface 36, could be otherwise configured for a given pin-conveying, or other article conveying application. For example, the relevant surface could include projections, such as notches, ridges, fingers etc., to augment or further enhance the conveying capability of the belt.

To form the elastomeric second layer 24 of the belt, a lateral portion of which forms the belt pin-contact portion 40, a rubber composition comprising a combination of polychloroprene and an ethylene-alpha olefin elastomer, including but not limited to ethylene propylene diene terpolymer ("EPDM"), ethylene propylene copolymer ("EPM"), ethylene butene copolymer; ethylene pentene copolymer and ethylene octene copolymer or combinations of two or more of the foregoing is preferably employed. In one embodiment of the present invention, an EPDM elastomer is employed, and in another embodiment, a low molecular weight EPDM is employed in such blend. Any conventional or suitable diene monomer may be utilized as the diene component of the EPDM, including for example 1,4-hexadiene, dicyclopentadiene (DCPD), and ethylidene norbornene. In a preferred embodiment however, DCPD is selected as the diene monomer, to form an ethylene propylene dicyclopentadiene elastomer (EP(DCPD)). In an embodiment of the present invention, the EPDM utilized in the elastomer blend is a low molecular weight, low viscosity liquid EP(DCPD) available under the trademark, TRILENE 65, by Uniroyal Chemical Co., and in a further embodiment, the EPDM component is a low molecular weight EP(DCPD) (72%) on a silicon dioxide carrier, such as that available under the trademark, TRILENE 65-DLC-A, from Natrochem, Inc., of Savannah, Ga. The EP(DCPD) has been found to be more easily dispersed and processed in the latter form, and the silica contained in that form is moreover believed to further contribute to the improved properties of the subject invention in one embodiment thereof, described in further detail below.

As the other elastomer component in the second layer elastomer blend, any conventional and/or suitable general purpose polychloroprene elastomer may be employed, including those available under the trademark, NEOPRENE by DuPont Dow Chemical Company, and BAYPREN by Bayer Chemical. In an embodiment of the present invention, the polychloroprene component of the elastomer blend is a sulfur-modified polychloroprene, such as those available under the trademarks, BAYPREN K8785 and NEOPRENE GRT, optionally stabilized with thiuram disulfide In the practice of an embodiment of the present invention, a polychloroprene and EPDM blend comprising not more than 40 parts of EPDM per hundred parts of elastomer (phr) is employed. More preferably, the blend contains from about 1 to not more than 30 phr EPDM, and most preferably, the blend contains from about 5 to about 15 phr of EPDM, wherein the remainder of the elastomer component of the blend is polychloroprene. At levels of EPDM exceeding about 30 phr based on total elastomer content, the blend composition generally becomes difficult to process utilizing conventional rubber compounding apparatus and techniques.

In accordance with further embodiments of the present invention, the polychloroprene to ethylene propylene diene terpolymer weight ratio in the composition of at least one of the belt's first layer and second layer's flexible portions is from about 9.5:0.5 to about 7.5:2.5, and may furthermore be from about 90:10 to about 80:20.

In the practice of the present invention, it has been surprisingly found that blending EPDM in the polychloroprene of the second layer, and in particular at the pin-contact surface 40 provides a belt having a beneficial balance of properties, including coefficient of friction, hardness and tensile properties, over an appreciable service life. Field testing of pin-conveying belts having topping portions formed of compositions according to the subject invention, has surprisingly revealed significant reductions in the incidence of belt failure compared to pin conveying belts having topping portions formed of conventional polychloroprene compositions.

To illustrate the effects of the addition of various levels of EPDM to a polychloroprene composition, the following analysis was performed. The Comparative ("Comp.") Example A–E samples comprised polychloroprene (CR) compositions lacking an ethylene alpha olefin component, and the Example 1–5 samples comprised EPDM/CR blends at the noted weight ratios. For each of the Examples 1–5, the respective amounts of silica (Si) indicated in Table 1 were contributed through the addition of TRILENE 65-DLC-A, in which silicon dioxide is present in the reported amount. For the Comparative Examples A–E (i.e., those not containing EP(DCPD)), corresponding amounts of silicon dioxide were separately added, to equal the amount contributed by the TRILENE 65-DLC-A in the Examples 1–5 of the invention.

For each of the Examples 1–5 and Comparative Examples A–E set forth in the tables below, "CR" denotes polychloroprene polymer that in each case was a sulfur-modified polychloroprene polymer stabilized with a thiuram disulfide and a non-discoloring antioxidant, available under the trademark, NEOPRENE GRT by DuPont Dow Chemical Co. In each example, the EPDM was a low molecular weight EP(DCPD) terpolymer (72%) on silicon dioxide carrier under the trademark TRILENE 65-DLC-A available from Natrochem, Inc.

The Example A–E and Example 1–5 compositions furthermore included conventional rubber compounding ingredients in amounts conventionally employed. Specifically, in each case the formulation furthermore included 25 phr of Carbon Black (type N762) (reinforcing filler); 18 phr of hydrated aluminum silicate (non- or semi reinforcing filler) known conventionally as "hard clay" variously available from J. M. Huber Corp. or C. P. Hall Company; 18 phr of aromatic petroleum extract oil (plasticizer) equivalently available under the trademark STANFLUX GP (by Harwick) and CALIFLEX GP (by Golden Bear); 4 phr Magnesium Oxide; 5 phr low molecular weight thermoplastic hydrocarbon blend of aromatic and aliphatic feedstocks (for improved tack) available under the trademark PETROREZ 100 (by Akrochem); 2 phr low molecular weight polyethylene (process aid) available under the trademark ACR 617A (by Allied Signal Corp.); 1.50 phr of Stearic acid; 7 phr zinc oxide and 0.2 phr polychloroprene cure accelerator available under the trademark VANOX PML (by Vanderbilt Rubber Co.). Each formulation furthermore included 3 phr of a conventional antioxidant/antiozonant system conventionally employed in polychloroprene compositions. A process aid incorporated solely to facilitate polychloroprene polymer mixing was furthermore employed in all compositions.

In Examples 2 . 5, sulfur was added as shown in Table 1, in the form of an 80% lend with naphthenic oil, available under the trademark CRYSTEX 0T20, available from Flexys America. The respective amounts of sulfur added to the compositions could readily be recognized by the skilled practitioner as being generally insufficient fully cure the EPDM moiety in the blends. As reported in The Vanderbilt Rubber Handbook (13$^{th}$ ed. 1996) for example, suitable levels of sulfur for curing 100 parts of EPDM are in the range of from 0.5 to 2 parts per hundred weight of elastomer (phr). While the manufacturer of the particular proprietary polychloroprene polymer utilized in the compositions also indicates that some amount of sulfur is present in the polymer composition, it was intended that the EPDM in the compositions remain only partially cured, for reasons provided and described fully below.

In each of the examples set forth below in Table 1, elastomer processing was carried out in the following manner. Mixing was carried out in a BR Banbury mixer having an inner volume of 1570 cubic centimeters; kneading was carried out at approximately 77 rpm. The batches were processed as one step mixes. In each instance, all ingredients were added to the Banbury mixer and mixed until reaching a mix temperature of 180° F., at which point it was scraped; then mixed again until reaching a temperature of 200° F. and scraped again; then mixed again until reaching a temperature of 230° F., at which point the mix was dropped.

TABLE 1

| | Comp. Example A | Example 1 | Comp Example B | Example 2 | Comp Example C | Example 3 | Comp Example D | Example 4 | Comp Example E | Example 5 |
|---|---|---|---|---|---|---|---|---|---|---|
| CR | 100 | 90 | 100 | 85 | 100 | 80 | 100 | 75 | 100 | 70 |
| EPDM | 0 | 10 | 0 | 15 | 0 | 20 | 0 | 25 | 0 | 30 |
| Silica | 3.88 | 3.88 | 5.83 | 5.83 | 7.63 | 7.63 | 9.72 | 9.72 | 11.66 | 11.66 |
| Sulfur | 0 | 0 | 0 | 0.04 | 0 | 0.08 | 0 | 0.11 | 0 | 0.15 |

Physical tests were conducted for molded compounds after molding and again after heat aging at 320° F. for each of the respective periods shown in Table 2. Properties of the vulcanized products were measured according to the following test protocols: Tensile data by ASTM D412-87; Tensile data for aged samples by ASTM D573-88; Hardness (Durometer) by ASTM D2240-91 (samples tested at 257° F. after heat-aging); Coefficient of Friction utilizing a Falex® Corporation Multi-Specimen Tester, and Cure properties (MDR) utilizing Monsanto Disc Rheometer and associated method; Flex Fatigue Resistance by Demattia method ASTM D813-59. For the coefficient of friction determinations, tests were conducted over a thirty-minute period, at a set pressure of 2 lbs (3.6 psi) and at 5 rpm (0.245 inches/second). The "initial" values reported in Table 2 are the average of values taken over the first minute of the test. The "average" values reported are the average of values taken over the final fifteen (15) minutes of the test. Average sample temperature ("Temp") reported is that of each sample between 15 and 30 minutes of testing.

TABLE 2

| | Comp. Example A | Example 1 | Comp Example B | Example 2 | Comp Example C | Example 3 | Comp Example D | Example 4 | Comp Example E | Example 5 |
|---|---|---|---|---|---|---|---|---|---|---|
| MDR | | | | | | | | | | |
| MH | 9.98 | 9.01 | 9.97 | 8.82 | 10.11 | 8.52 | 10.56 | 8.37 | 12.3 | 3.91 |
| ML | 0.47 | 0.53 | 0.49 | 0.47 | 0.5 | 0.51 | 0.52 | 0.44 | 0.71 | 0.35 |
| Tb | | | | | | | | | | |
| Original | 2332 | 1764 | 2705 | 1478 | 2410 | 1222 | 2598 | 1149 | 2042 | 766 |
| 24-hour | 2445 | 1512 | 2405 | 1520 | 2394 | 1190 | 2408 | 1100 | 1897 | 707 |
| 48-hour | 2102 | 1810 | 2316 | 1535 | 2417 | 1305 | 2406 | 1099 | 2068 | 752 |
| 72-hour | 1972 | 1506 | 1906 | 1296 | 2196 | 1153 | 2312 | 1040 | 1960 | 865 |
| Eb | | | | | | | | | | |
| Initial | 622 | 572 | 684 | 487 | 617 | 440 | 657 | 416 | 628 | 334 |
| 24-hour | 677 | 435 | 706 | 451 | 649 | 347 | 562 | 324 | 493 | 189 |
| 48-hour | 506 | 466 | 513 | 386 | 560 | 329 | 539 | 253 | 455 | 150 |
| 72-hour | 403 | 335 | 373 | 282 | 444 | | | | 368 | 137 |
| M100 | | | | | | | | | | |
| Original | 253 | 227 | 257 | 225 | 281 | 235 | 288 | 259 | 302 | 259 |
| 24-hour | 351 | 316 | 358 | 328 | 403 | 357 | 406 | 392 | 452 | 415 |
| 48-hour | 431 | 415 | 495 | 434 | 500 | 462 | 541 | 531 | 567 | 563 |
| 72-hour | 521 | 502 | 553 | 517 | 588 | 565 | 628 | 638 | 694 | 705 |
| M200 | | | | | | | | | | |
| Original | 541 | 487 | 557 | 485 | 604 | 504 | 629 | 528 | 615 | 520 |
| 24-hour | 743 | 662 | 754 | 671 | 822 | 719 | 846 | 740 | 889 | * |
| 48-hour | 898 | 844 | 1008 | 856 | 1014 | 889 | 1090 | 938 | 1076 | * |
| 72-hour | 1042 | 965 | 1098 | 987 | 1136 | 1022 | 1217 | * | 1251 | * |
| M300 | | | | | | | | | | |
| Original | 912 | 831 | 942 | 806 | 999 | 814 | 1030 | 826 | 982 | 639 |
| 24-hour | 1186 | 1051 | 1197 | 1031 | 1267 | 1062 | 1300 | 1045 | 1314 | * |
| 48-hour | 1369 | 1262 | 1496 | 1240 | 1502 | 1232 | 1583 | * | 1516 | * |
| 72-hour | 1533 | 1385 | 1592 | * | 1623 | * | 1716 | * | 1704 | * |
| DeMattia Flex | | | | | | | | | | |
| Room Temperature | 0.33 | 0.33 | 0.22 | 0.77 | 0.88 | 1.00 | 1.00 | 1.22 | 0.88 | 14.33 |
| At 212° F. | 1.33 | 0.77 | 2.55 | 0.77 | 2.55 | 1.44 | 2.44 | 1.33 | 3.88 | 16.00 |
| Durometer | | | | | | | | | | |
| Initial | 48.0 | 46.6 | 48.9 | 46.2 | 49.8 | 46.4 | 50.5 | 47.9 | 52.1 | 47.8 |
| 24-hour | 56.1 | 54.5 | 55.5 | 54.4 | 57.8 | 55.7 | 59.9 | 56.7 | 61.5 | 58.5 |
| 48-hour | 52.8 | 57.1 | 60.4 | 58.4 | 61.9 | 59.6 | 63.6 | 61.2 | 63.4 | 62.4 |
| 72-hour | 61 | 60.2 | 63.4 | 62.2 | 65 | 64.1 | 66.9 | 65.7 | 67.1 | 66.6 |
| Initial coefficient of friction | 2.2 | 2.0 | 1.5 | 1.7 | 1.0 | 1.2 | 2.7 | 2.8 | 1.0 | 2.0 |
| Average coefficient of friction | 3.15 | 4.01 | 2.51 | 2.59 | 2.39 | 1.72 | 3.76 | 3.43 | 3.66 | 3.66 |
| Ave. Temp. (coefficient of friction test | 26.31 | 26.69 | 27.19 | 25.81 | 27.44 | 26.81 | 24.19 | 27.42 | 29.84 | 25.81 |

*Specimen possessed insufficient elongation properties to reach test strain level noted. No data obtained.

The data of Table 2 reveals that with only minor exceptions (Example B, 24 hour result, and Example 2, 48-hour result) all of the initial-, 24-hour, 48-hour and 72-hour aged hardness of the Examples A–E increases slightly with increasing amounts of silica, as expected. In the absence of a silica component, it is submitted that an otherwise comparable polychloroprene composition would generally exhibit even lower hardness than that of Example A. As seen in the corresponding initial-and 24-hour aged hardness results for Examples 1–5, a slight deviation from linearly positive behavior occurred at 15 phr of EPDM (Example 2). Overall, and again with minor exception (i.e., Example A, 48-hour test) the Examples 1–5 according to the subject invention however exhibited slightly lower initial and 24-hour aged hardness than did the Examples A–E compositions containing no EPDM component, but containing equivalent levels of silica. Thus, the data of Table 2 illustrates that at equivalent levels of silica, polychloroprene compositions containing EPDM generally exhibited slightly lower initial- and aged hardness characteristics than did those compositions not containing EPDM.

As would be readily appreciated by one of ordinary skill in the relevant art, ethylene alpha olefin elastomers such as EPDM elastomers are generally cured through the addition of sulfur (for EPDM) or peroxide or other free-radical producing materials. Polychloroprene polymers are conversely cured through the addition of metallic oxides, i.e., magnesium- and zinc oxide. In the composition of an embodiment of the present invention, sufficient polychloroprene-curing agents are incorporated to fully cure the polychloroprene moiety, but an amount of EPDM curative sufficient to fully cure the EPDM moiety is not incorporated. Instead, an amount of EPDM curative insufficient to fully cure the EPDM moiety is incorporated, and the EPDM in the final composition remains only partially cured. This partially cured EPDM moiety is believed to provide improved tack at the belt's pin contacting service, which furthermore thus retains a tacky or sticky quality, and concomitantly a high coefficient of friction and relatively constant hardness, substantially throughout the belt's service life. This increased tack greatly improves the belt's ability to establish and maintain surface contact with the pin, even for those pins of current design having relatively low coefficient of friction-coated surfaces.

Because polychloroprene and ethylene alpha olefin elastomers such as EPDM are well known to be highly incompatible elastomers, it is presently believed that they have heretofore not been blended with one another to form a single composite in a belt elastomer for either conveying or power transmitting applications. It has surprisingly been found that the present combination in fact provides improved pin conveying characteristics and decreased incidence of belt failure over belts containing polychloroprene in the absence of an ethylene alpha olefin constituent such as EPDM. The belts of the present invention provide a balance of improved conveying characteristics, as manifested in a combination of optimal hardness and coefficient of friction, extended cure period, lower tensile strength, lower elongation, lower modulus, and improved flex fatigue- and crack resistance and heat aging characteristics with increasing EPDM levels within the claimed range.

By incorporating up to 30%, preferably less than 20% and most preferably from 5–15% by weight of EPDM (based on total elastomer content) in the polychloroprene blend composition according to an embodiment of the present invention, it is believed that one forms a heterogeneous mixture of polymers in the composition wherein small pockets of EPDM are surrounded by, but not generally polymerized or otherwise reacted with adjacent polymer molecules. By incorporating an amount of EPDM-curing agent(s) insufficient to fully cure the EPDM such that the EPDM remains only partially cured within the composition, significant adhesion of the EPDM molecules to the surrounding polychloroprene molecules within the composition is believed to occur, such that belt failure due to adhesive failure within the overcord elastomer composition (i.e., overcord deterioration) has not been observed to date in field testing. This phenomenon is believed to contribute to the improved flex fatigue resistance and crack resistance reported in Table 2.

Moreover, because the EPDM in the polychloroprene/EPDM blend compositions of an embodiment of the present invention remains only partially cured, once incorporated therein, the elastomeric composition forming the overcord sidewall portions of the pin conveyer belt retains a tacky or sticky quality, and concomitantly a high coefficient of friction and relatively constant hardness, throughout its service life. This increased tack greatly improves the belt's ability to establish and maintain surface contact with the pin, even for those pins of current design having relatively low coefficient of friction-coated surfaces.

The incorporation of an insufficient amount of ethylene propylene diene terpolymer curative in the blend compositions of the present invention, and consequent tack of the composition, is furthermore believed to effectively mask or greatly minimize the negative effects that the crystallization of the polychloroprene moiety would otherwise have on the ability of the belt to convey the low-coefficient of friction-coated pins.

The combination of preferably up to 30 phr of EPDM, more preferably of from about 2 to about 25 phr of EPDM, and most preferably of from about 5 to about 15 phr of EPDM, with a polychloroprene elastomer to form a polychloroprene/EPDM blend, provides a belt, particularly when incorporated therein as set forth above, that exhibits a beneficial balance of properties, including frictional behavior, hardness, flex fatigue resistance, crack resistance and tensile properties, over an extended service life. In particular, when incorporated in a pin-conveying belt as described above for FIG. 4, a composition as described above as Example 1 has exhibited significantly extended service life compared to belts having a non-blended, conventional polychloroprene pin-conveying surface.

Any conventional or otherwise suitable method may be employed to form the belts of the subject invention. For example, one or more rubberized textile members may be plied onto a belt-building drum; thereafter applying other associated layers of, e.g., unvulcanized elastomer, tensile cord, adhesion gum, to the fabric; vulcanizing the assembly; and cutting, grinding, molding and/or skiving appropriate individual V-belt- and topping layer profiles.

Although the present invention has been described in detail for the purpose of illustration, it is to be understood that such detail is solely for that purpose and that variations can be made therein by one skilled in the art without departing from the spirit or scope of the present invention except as it may be limited by the appended claims. The invention disclosed herein may suitably be practiced in the absence of any element not specifically disclosed herein.

What is claimed is:

1. An endless belt comprising:
    (a) a first layer extending longitudinally of said belt and comprising a first flexible material;
    (b) a second layer comprising a second flexible material, said first layer and said second layer being generally parallel to one another;
    (c) and a load carrying section extending longitudinally of said belt and embedded therein; wherein,
    (d) at least one of said first flexible material and said second flexible material comprises an elastomer blend composition comprising at least a polychloroprene elastomer and an ethylene alpha olefin elastomer; and
    (e) said ethylene alpha olefin elastomer is less than fully cured.

2. The belt of claim 1 used in conjunction with at least one pulley, said belt capable of cooperating with an oppositely facing endless belt to contact and convey articles, said belt-comprising:
    a) said first layer comprising said first flexible material, extending longitudinally of the belt and comprising a driving surface of said belt;
    b) said second layer comprising said second flexible material, spaced from and generally parallel to said first layer, and possessing a first surface, and a second surface disposed opposite said first surface and defining an article conveying surface of said belt;

c) said load carrying section comprising a tensile cord of high modulus material disposed within said first layer, and characterized in that at least said second flexible material comprises said polychloroprene and ethylene alpha olefin elastomer blend composition.

3. A belt suitable for use in conveying applications, comprising:

(a) a first layer comprising a compression section, a tension section, at least one longitudinally extending tensile element disposed between said sections; and;

(b) a second layer, said second layer possessing a contacting surface and a second surface opposite said contacting surface, and characterized in that at least said contacting surface comprises a polychloroprene and ethylene alpha olefin elastomer blend composition, said ethylene alpha olefin elastomer being selected from ethylene propylene diene terpolymer, ethylene propylene copolymer, ethylene butene copolymer, ethylene pentene copolymer, ethylene octene copolymer and a combination of at least any two thereof; and said ethylene alpha olefin elastomer is less than fully cured.

4. The belt of claim 3 wherein said ethylene alpha olefin elastomer is said ethylene propylene diene terpolymer.

5. The belt of claim 4 wherein said elastomer blend composition further comprises from about 0.5 to about 25 parts per hundred weight of elastomer of silica.

6. The belt of claim 4 wherein said ethylene propylene diene terpolymer comprises dicyclopentadiene as a diene monomer.

7. The belt of claim 3 wherein said ethylene alpha olefin elastomer is said ethylene propylene diene terpolymer and the polychloroprene to ethylene propylene diene terpolymer weight ratio in said elastomer blend composition is from about 9.5:0.5 to about 7.5:2.5.

8. A flexible bowling pin conveying belt used in conjunction with at least one pulley, said belt capable of cooperating with an oppositely facing endless belt to contact and convey bowling pins, said belt comprising:

a. a first layer comprising a first flexible material, extending longitudinally of the belt and comprising a driving surface of said belt;

b. a second layer comprising a second flexible material, spaced from and generally parallel to said first layer and possessing a first surface, and a second surface disposed opposite said first surface and defining a pin conveying surface of said belt;

c. a tensile section of high modulus material disposed between said first and second layers, and characterized in that said first flexible material comprises a polychloroprene and low molecular weight ethylene propylene dicyclopentadiene elastomer blend having a polychloroprene to ethylene propylene diene terpolymer weight ratio of from about 90:10 to about 80:20, and further comprising an ethylene propylene diene terpolymer curative in an amount insufficient to fully cure said ethylene propylene diene terpolymer.

* * * * *